United States Patent
Ladouceur et al.

(10) Patent No.: US 7,628,924 B2
(45) Date of Patent: Dec. 8, 2009

(54) MASS TRANSFER APPARATUS AND METHOD

(76) Inventors: Nels Robert Ladouceur, 4694 Holly Park Place, Delta, British Columbia (CA) V4K 4T8; Peter Douglas Jack, 466 Tsawwassen Beach Road, Delta, British Columbia (CA) V4M 4C8

( * ) Notice: Subject to any disclaimer, the term of this patent is extended or adjusted under 35 U.S.C. 154(b) by 120 days.

(21) Appl. No.: 11/254,809

(22) Filed: Oct. 21, 2005

(65) Prior Publication Data

US 2006/0086669 A1    Apr. 27, 2006

(51) Int. Cl.
*C02F 1/24* (2006.01)
*B01F 3/04* (2006.01)

(52) U.S. Cl. .............. 210/703; 210/706; 210/760; 210/750; 210/741; 210/221.2; 210/188; 261/79.2

(58) Field of Classification Search ......... 210/703, 210/706, 760, 750, 741, 221.2, 188; 261/79.2
See application file for complete search history.

(56) References Cited

U.S. PATENT DOCUMENTS

| | | | | |
|---|---|---|---|---|
| 2,242,139 | A * | 5/1941 | Munroe | 210/705 |
| 2,746,605 | A * | 5/1956 | Baum | 210/137 |
| 2,779,731 | A * | 1/1957 | Kelly et. al. | 210/519 |
| 2,994,432 | A * | 8/1961 | Schluter | 210/101 |
| 4,353,717 | A * | 10/1982 | Herbrechtsmeier et al. | 95/230 |
| 5,053,140 | A * | 10/1991 | Hurst | 210/704 |
| 5,693,222 | A * | 12/1997 | Galvan et al. | 210/194 |
| 5,843,307 | A * | 12/1998 | Faivre et al. | 210/192 |
| 6,562,240 | B1 * | 5/2003 | Clark | 210/703 |
| 6,629,686 | B2 | 10/2003 | Morse et al. | |
| 6,896,816 | B2 * | 5/2005 | Everton | 210/705 |
| 2002/0195398 | A1 * | 12/2002 | Morse et al. | 210/705 |

FOREIGN PATENT DOCUMENTS

CA        2301583        3/1999

* cited by examiner

*Primary Examiner*—Thomas M Lithgow (57) ABSTRACT

The invention relates to an apparatus and method for more effectively dissolving a gas into a liquid stream. A gas is introduced into a liquid stream, at atmospheric pressure, to create a mixed/dissolved stream. The mixed/dissolved stream is then pressurized to an elevated pressure and directed into a hydrocyclone where the gas is further dissolved and more thoroughly distributed in the liquid thereby creating a more intimately mixed/dissolved stream. The intimately mixed/dissolved stream is then directed to a pressure retention vessel where the liquid is held at a predetermined pressure for a predetermined time period for effectively treating, disinfecting and/or clarifying said intimately mixed/dissolved stream. The treated intimately mixed/dissolved stream can then be directed to further processing steps.

9 Claims, 6 Drawing Sheets

MASS TRANSFER APPARATUS AND METHOD

FIELD OF THE INVENTION

The present invention relates generally to an apparatus and method for dissolving a gas into a liquid stream.

BACKGROUND OF THE INVENTION

The introduction of a gas into a liquid stream is common in many different processing operations. Accordingly, the present invention finds applications in a number of fields such as the treatment of waste and water streams, and disinfecting and clarifying potable water and other fluids. The present invention also finds applications in the food and pharmaceutical industry, as well as industries requiring products that require efficient mass transfer of ozone, air, or other gas for the purpose of flotation, clarification, and/or disinfection. More specifically, the introduction of a gas, such as ozone, air or oxygen, into a liquid stream is common in many disinfecting, treatment and clarifying processes. Very often, ozone is introduced into drinking water sources, ballast water, waste water streams and/or cooling water streams so as to disinfect, treat and/or clarify such liquids due to its superior disinfecting effectiveness over other gases, such as chlorine. Many different methods and techniques have been designed to try and improve the various disinfecting, treatment and clarifying process. When dealing with ozone, additional factors must be considered namely, the unstable nature of the gas which tends to result in higher equipment and operational costs as well as less compact systems. Accordingly, there is a desire to improve the techniques and methods used for introducing, mixing, blending and dissolving a gas into a liquid stream, especially for processes that involve the use of ozone gas.

Canadian Patent Application No. 2,301,583 (Separation Technologies Group PTY. LTD.) discloses a method and apparatus for mixing a first material and a second material, wherein the first material comprises a mixture of two or more dissimilar components that are to be separated. The '583 application discloses the use of a hydrocyclone to mix different materials together prior to their separation. The use of a hydrocyclone in the pre-treatment of the materials to be separated was found to improve the subsequent separation of the materials. The '583 application also discusses the benefits of introducing air or a gas into the mixture of materials to be separated prior to the mixture entering the hydrocyclone. More specifically, the aeration or gasification of the first material facilitates the separation of the dissimilar components in the first material as one of the dissimilar components is entrained or otherwise associated with the air or gas bubbles that are formed from mixing the first and second materials together. It is the formation of millions of tiny gas bubbles that facilitates the subsequent separation of materials as the bubbles entrain or suspend the solid particles or droplets, bringing them to the surface during the subsequent processing steps. The '583 application does not disclose the complete dissolution of a gas within a liquid, as it relies on the formation of gas bubbles within the mixed stream to assist in subsequent separation processes. As well, the system is not necessarily well suited for the dissolution of large amounts of ozone in a liquid stream.

U.S. Pat. No. 6,629,686 (Morse et al.) discloses a process and system for dissolving gas into a liquid at greater concentrations and saturations than previous methods known in the art. A hydrocyclone is used to introduce an intended gas into the liquid stream to be treated. The amount of gas dissolved in the liquid can be optimized by adjusting various parameters of the hydrocyclone, namely by altering the pressure of the incoming liquid, changing the aspect ratio of the inlet, and varying the diameter D and length L of the barrel. Upon exiting the hydrocyclone, the mixed liquid and gas stream enters a diffusion chamber, which converts the radial spin of energized liquid from the hydrocyclone into laminar axial flow. The diffusion chamber is disposed within a pressure chamber, which includes an upper gas region and a lower liquid region. The diffusion chamber is located in the lower liquid region of the pressure chamber so that only large bubbles of undissolved gas coalesce and rise into the gas region of the pressure chamber, while the dissolved gas and micro-size gas bubbles that are retained in the liquid flow with the liquid into the liquid region of the pressure chamber. The gas in the upper region of the pressure chamber is recycled back through the system to the hydrocyclone so that gas is not unnecessarily wasted, and the liquid and dissolved gas mixture can exit the pressure chamber and be held in a storage tank or can be passed along to the next process step in the system. While the '686 patent discloses the use of a pressure chamber, the pressure chamber does not serve as the primary treatment or disinfection vessel. Furthermore, the system does not achieve complete dissolution of the gas into the liquid as it relies on the creation of micro-bubbles to distribute the gas evenly through the liquid.

SUMMARY OF THE INVENTION

The present invention, however, provides an apparatus and method for more effectively dissolving a gas into a liquid stream. According to one aspect of the invention there is provided an apparatus for dissolving a gas into a liquid stream for the treatment, disinfection and/or clarification thereof. The apparatus comprises means for introducing a gas, at atmospheric pressure, into the liquid stream to create a mixed stream, and a pump having an inlet for receiving the mixed stream of liquid and gas, and an outlet for discharging the mixed stream at an elevated pressure. At least one hydrocyclone is connected downstream from the pump outlet for more thoroughly mixing and dissolving the gas into the mixed stream, creating a more intimately mixed stream, the at least one hydrocyclone including at least one inlet for receiving the pressurized mixed stream and having one outlet for discharging the more intimately mixed stream. A pressure retention vessel is connected downstream from the hydrocyclone for holding the intimately mixed stream at a predetermined pressure for a predetermined time period for effectively treating and/or disinfecting the intimately mixed stream, thereby creating a treated stream. The pressure retention vessel has an inlet for receiving the intimately mixed stream from the hydrocyclone, a first outlet for discharging the treated intimately mixed stream, and a second outlet for discharging any residual gas that has escaped from the intimately mixed stream. Pressure control means are provided in communication with the at least one hydrocyclone and the pressure retention vessel for adjusting the pressure of the mixed and intimately mixed streams to ensure effective dissolution of the gas within the liquid stream.

According to another aspect of the invention there is provided a method for dissolving a gas into a liquid stream comprising the steps of (i) injecting a gas into a liquid stream at atmospheric pressure to create a mixed stream, (ii) pressurizing the mixed stream to a predetermined level, (iii) directing the mixed stream into a hydrocyclone to create a more intimately mixed stream, (iv) directing the intimately mixed stream from the hydrocyclone to a pressure retention vessel and holding the intimately mixed stream in the pressure retention vessel at a predetermined pressure for a predetermined time period to ensure the proper disinfection or treatment of thereof, thereby creating a treated stream.

BREIF DESCRIPTION OF THE DRAWINGS

The present invention will be better understood with reference to the detailed description taken in combination with the drawings in which.

DETAILED DESCRIPTION OF THE PREFERRED EMBODIMENTS

Figure 1:
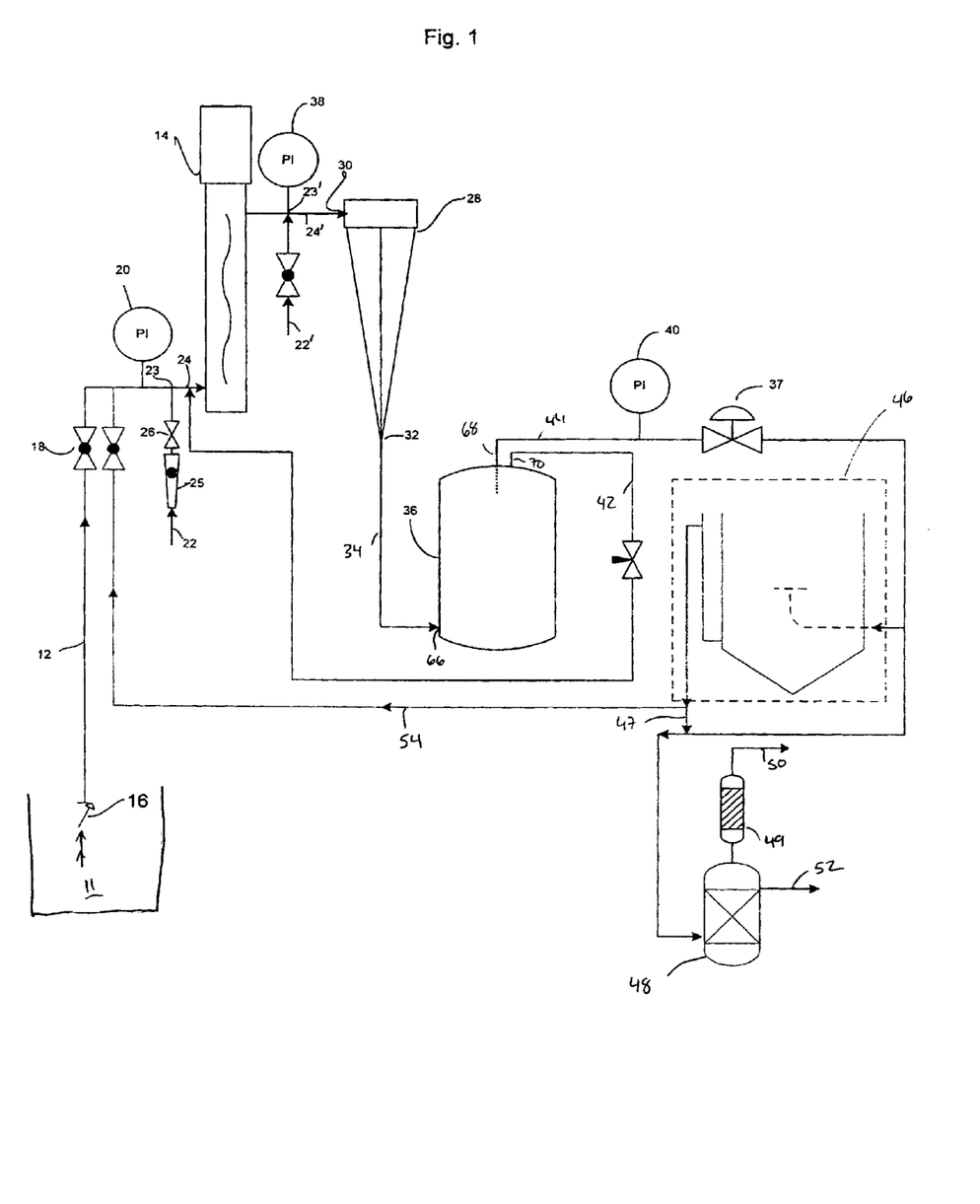
FIG. 1 is a schematic view of the mass transfer apparatus according to a preferred embodiment of the invention.

Referring to the drawings, there is shown in FIG. 1 a schematic of the mass transfer apparatus 10 according to the present invention. The apparatus includes a liquid feed line 12 located proximal to an untreated liquid source 11 and connected to the suction side of a progressive cavity or helical rotor pump 14. Liquid entering the liquid feed line 12 is controlled by a foot valve 16 located at the inlet end of the liquid feed line 12, the foot valve 16 being in communication with the untreated liquid source 11. A second valve 18 located in the feed line 12 downstream from the foot valve 16 controls the amount of untreated liquid entering the pump 14. When in operation, valve 18 is pinched, or partially closed, so as to maintain a slight vacuum at the pump inlet. A pressure indicator 20 is mounted at the inlet to the pump 14, which is designed to show the amount of vacuum present at the pump inlet or suction. A gas feed line 22 is provided for introducing the intended gas, at atmospheric pressure, into the liquid stream. Ozone, air, oxygen or any other suitable gas, depending on the type of process, may be used. The apparatus 10 is particularly well-suited for use with ozone gas since the gas is introduced at atmospheric pressure. Due to the unstable nature of ozone gas, handling of the gas becomes more difficult when higher pressures are required; therefore the present invention avoids any such difficulties as the ozone is introduced at atmospheric pressure.

The gas feed line 22 connects with the liquid feed line 12 at junction 23 to create a mixed stream 24 of liquid and gas which then enters the pump 14. A gas flow meter (or rotameter) 25 and needle valve 26 are used to control and provide a visual reading of the amount of gas that is being introduced into the liquid stream. Progressive cavity/helical rotor pumps are able to accept the mixed stream 24 with the entrained vapours/gas without detrimental cavitation, which is what makes this type of pump ideal for use in the subject apparatus. Once the gas has been introduced into the liquid stream and the mixed stream 24 enters pump 14, the liquid and gas are pressurized to between about 80-150 psig depending on the type of gas and liquid stream involved in the process. When ozone is the gas being used, for instance in a water treatment process, the mixed untreated water ozone stream is pressurized to about 150 psig. This pressure has been found to be optimal for ozone, as much more ozone can be dissolved into the liquid at this pressure, thereby increasing its effectiveness as a disinfectant. Conventional mass transfer systems have been unable to achieve the same level of dissolution of ozone into the liquid stream.

If high-pressure gas (i.e. more than 150 psig) other than ozone is being introduced into the liquid stream, an alternate set-up can be used where a gas feed line 22' connects with the liquid stream on the discharge side of the pump 14 (as opposed to the suction side of the pump 14) at junction 23' to create mixed steam 24' on the discharge side of the pump 14. Once the mixed stream 24 (24') has been created and is pressurized to the desired level, the mixed stream 24 (24') enters a shearing hydrocyclone 28 where the gas is further sheared and dissolved and therefore is more completely mixed with the liquid. Once again, this system proves advantageous when using ozone as the gas, since the ozone is completely dissolved in the liquid rather than being diffused or bobbled into the liquid, as is common with many conventional mass transfer systems. Complete dissolution of the ozone gas into the gas is preferable as it provides the most complete contact with the liquid for more effective treatment/disinfection thereof.

Figure 2:
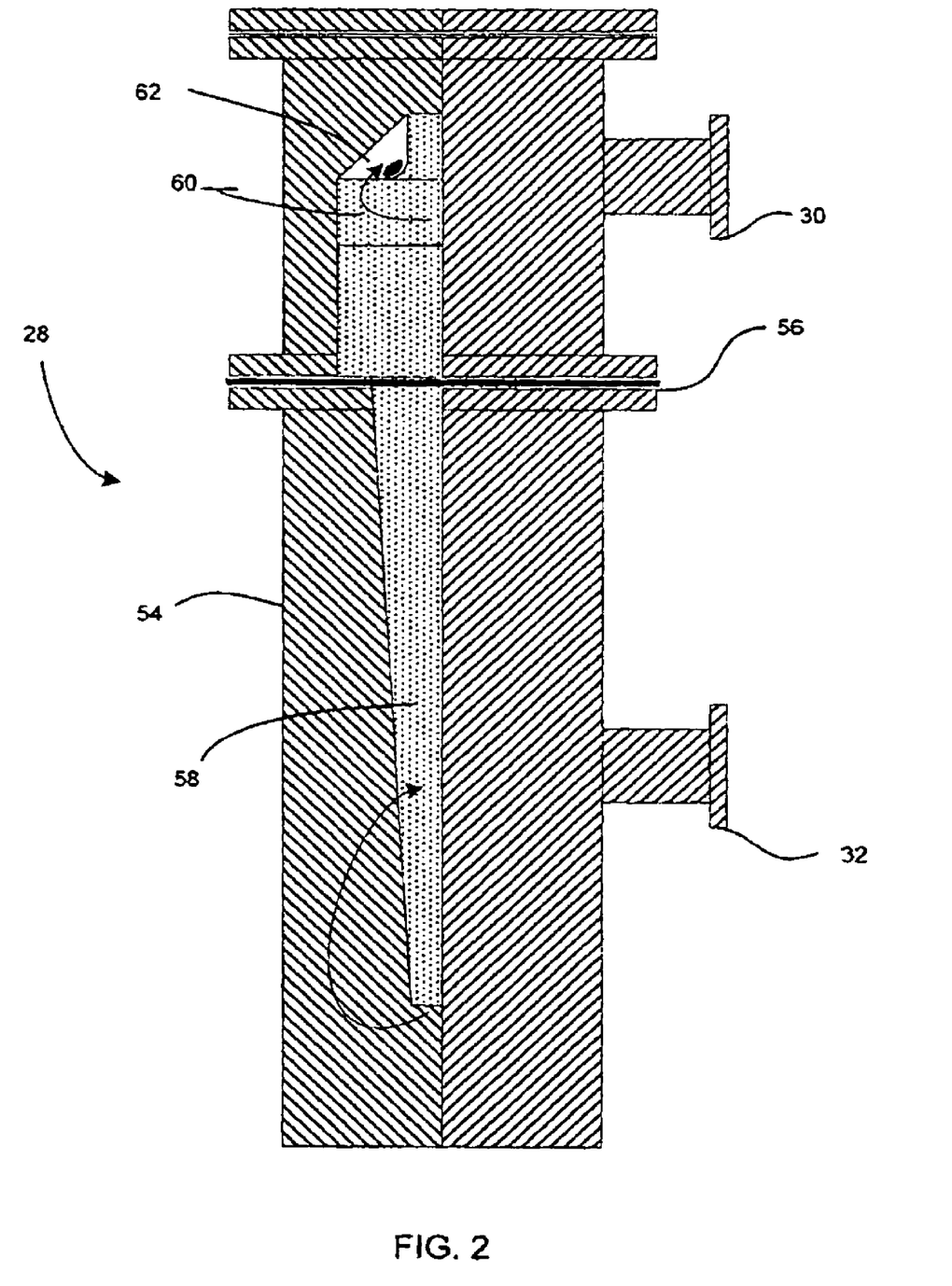
FIG. 2 is a partial cutaway view of the hydrocyclone of the mass transfer apparatus of the present invention.

As shown in FIG. 2, the hydrocyclone 28 comprises an outer housing vessel 54 that is divided into two sections by mounting plate 56. The hydrocyclone vessel 54 can have one or more tangential inlet ports 30, which may be equipped with ramps to initially induce a rotational flow at the head of the hydrocyclone 28. The vessel 54 contains one or more hydrocyclone liners 58, depending on the desired flows and pressures of the system. Not only can one or more hydrocyclone liners 58 be enclosed in one vessel 54, but more than one vessel containing a number of hydrocyclone liners can be used depending on the size and economics of the apparatus.

Figure 3A:
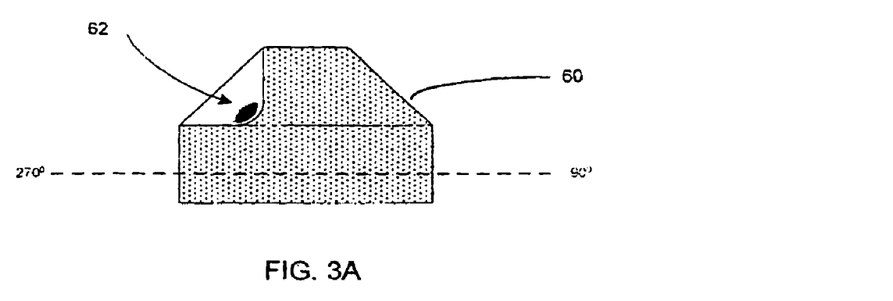
FIG. 3A is an elevation view of a spin inducer used in conjunction with the hydrocyclone of the mass transfer apparatus according to the present invention.
Figure 3B:
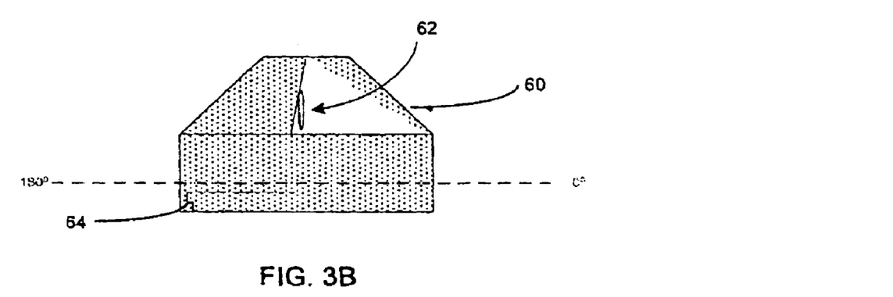
FIG. 3B is another elevation view of the spin inducer as seen 90° from the view shown in FIG. 3A.
Figure 3C:
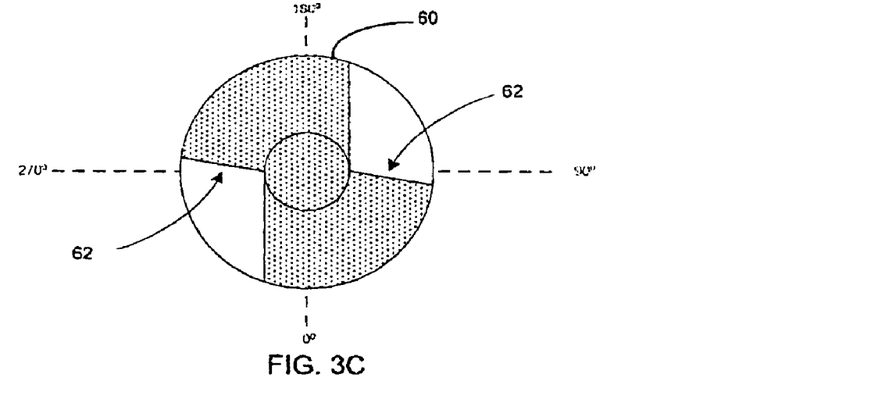
FIGS. 3C-3D are respective top and bottom views of the spin inducer of FIGS. 3A-3B.
Figure 3D:
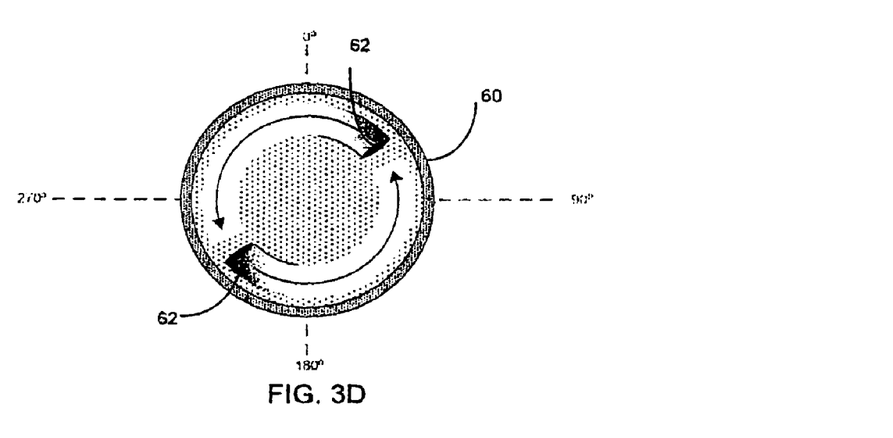
Figure 4A:
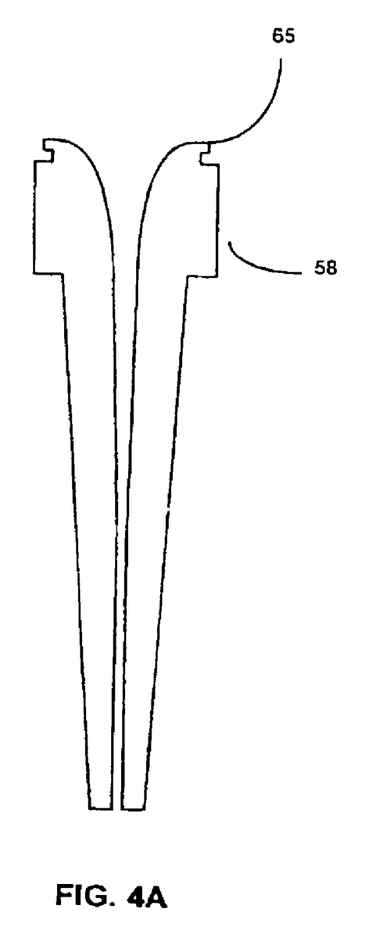
FIG. 4A is a is a cross-sectional view of a hydrocyclone liner used in the hydrocyclone of FIG. 2.
Figure 4B:
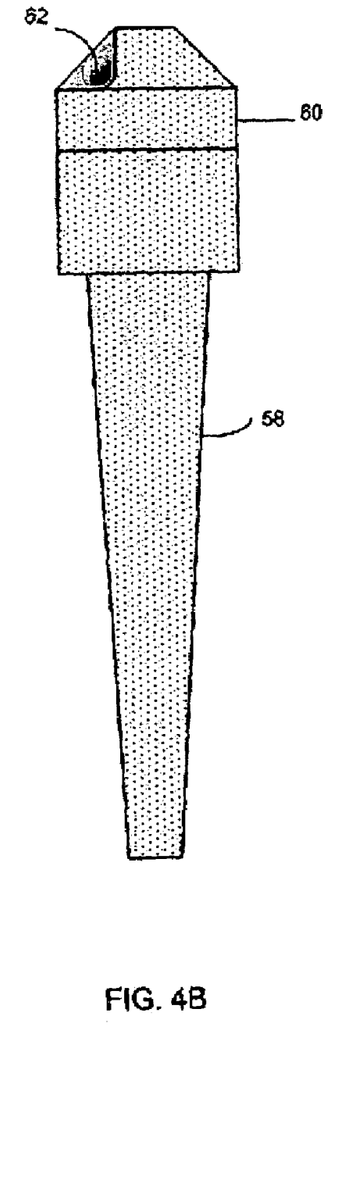
FIG. 4B is a side view of the spin inducer of FIGS. 3A-3D attached to the hydrocyclone liner.

A spin inducer 60 (see FIGS. 3A-3D) is also housed within the vessel 54 and is attached to the upper portion of the hydrocyclone liner 58. The spin inducer 60 includes one or more inlet openings 62 in communication with the one or more tangential inlet ports 30 of the vessel 54. As the mixed stream of liquid and gas enters the hydrocyclone 28 through the one or more tangential inlet ports 30, it is directed towards the openings 62 of the spin inducer 60, which force the mixed stream 24 (24') of liquid and gas to travel in a circular motion. According to one embodiment, the spin inducer 60 is secured to the hydrocyclone liner 58 by means of a flexible lip 64 (FIG. 3B) located on the bottom rim of the spin inducer 60 which mates with a corresponding lip 65 (FIG. 4A) on the hydrocyclone liner 58, when the spin inducer 60 is made of a flexible material such as polyurethane. Alternate materials for both the spin inducer 60 and the hydrocylone liner 58 include various grades of stainless steel. If the material being used for the spin inducer 60 is of a rigid nature, such as steel or ultra high molecular weight polyethylene, the spin inducer 60 is preferably threaded to the hydrocyclone liner 58. The hydrocyclone liner 58 with the spin inducer 60 attached thereto is shown in FIG. 4B.

Figure 4C:
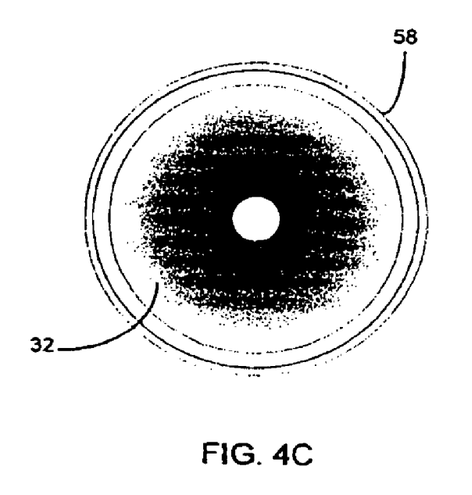
FIG. 4C is a top view of the hydrocyclone liner.
Figure 4D:
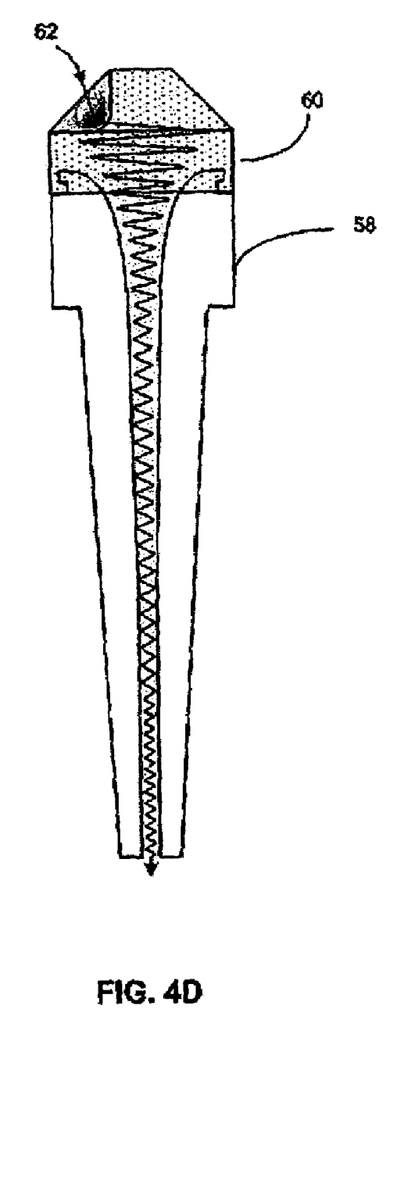
FIG. 4D is a cross-sectional view of the configuration of FIG. 4B showing the flow characteristics inside the spin inducer and hydrocyclone liner.

From the spin inducer 60, the liquid and gas mixed stream 24 enters the neck of the hydrocyclone liner 58. The reducing internal diameter of the hydrocyclone liner 58 (see FIGS. 4A and 4C) causes the gas and liquid mixed stream 24 (24') to accelerate to the single outlet 32 of the hydrocyclone 28. The typical flow pattern created by the hydrocyclone liner 58 is shown in FIG. 4D. The cyclonic action of the entire feed stream (i.e. the liquid and gas mixed stream 24) as it enters the hydrocyclone 28 promotes instantaneous, intimate contact between the liquid and the gas. As the mixture accelerates, any gas bubbles are sheared, then dissolved, and are dispersed evenly throughout the liquid forming a homogeneous, stable, aerated and blended product stream or more intimately mixed/dissolved stream 34. With no other exit or outlet provided in the hydrocyclone 28 for the less dense, entrained gas to escape, the gas follows the liquid to the only outlet 32 provided which ensures the thoroughly mixed/dissolved and blended product stream 34 at the outlet 32 of the hydrocyclone 28.

Referring back to the FIG. 1, the more intimately mixed/dissolved stream 34 of completely dissolved gas and liquid exits the hydrocyclone 28 via outlet 32 and is directed toward a pressure retention vessel 36. The intimately mixed/dissolved stream 34 remains in the pressure retention vessel 26 for a pre-determined period of time required for the proper disinfection or treatment of the intimately mixed/dissolved stream 34 to create a treated stream 44. The pressure within the pressure retention vessel 36 is maintained at a predetermined level to ensure that the gas remains completely dissolved in the liquid, and is not permitted to escape. This provides for more effective disinfection and/or treatment of the intimately mixed/dissolved stream 34 as there is more complete contact between the gas and the liquid to be treated. This is particularly true in the case of ozone. As well, the gas—liquid (e.g. ozone—liquid) contact time required in the present system is significantly reduced due to the complete dissolution of the gas within the liquid which, therefore, decreases the overall "treatment time". Furthermore, various sizes of pressure retention vessels may be used which allows for more complete usage of the gas. In the case of ozone gas, the more complete usage of the gas reduces ozone generation capacities for any given treatment or disinfection operation.

The pressure across the hydrocyclone 28 and the pressure retention vessel 36 is controlled by a back pressure control valve 37 located downstream of the pressure retention vessel 36. The back pressure control valve 37 can be hand controlled, controlled by a programmable logic controller (PLC), or controlled by a conventional pressure control loop. A pressure indicator 38 is provided at the inlet to the hydrocyclone 28, which provides a reading of the pressure of the mixed stream 24 (24') as it enters the hydrocyclone 28. A second pressure indicator 40 is located downstream of both the hydrocyclone 28 and the pressure retention vessel 36 which shows the pressure at the outlet 32 of the hydrocyclone 28 as well as the pressure within the pressure retention vessel 36.

Figure 5:
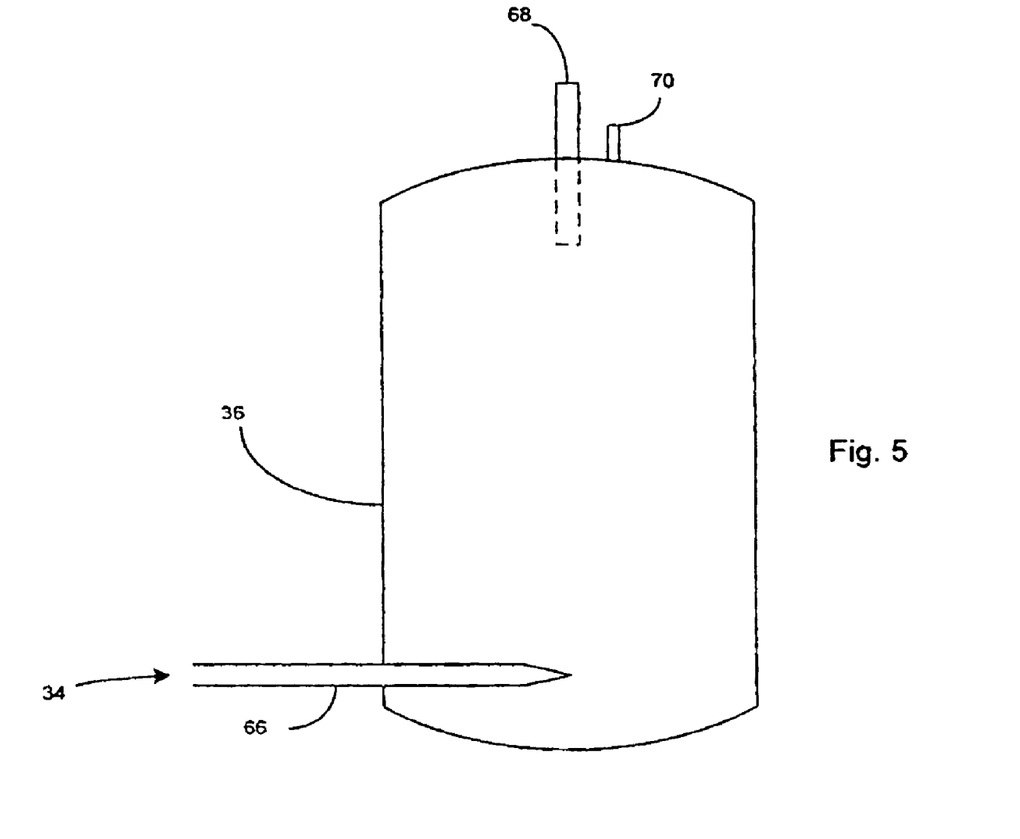
FIG. 5 is a side view of the pressure retention vessel of the mass transfer apparatus of the present invention.
Figure 5A:
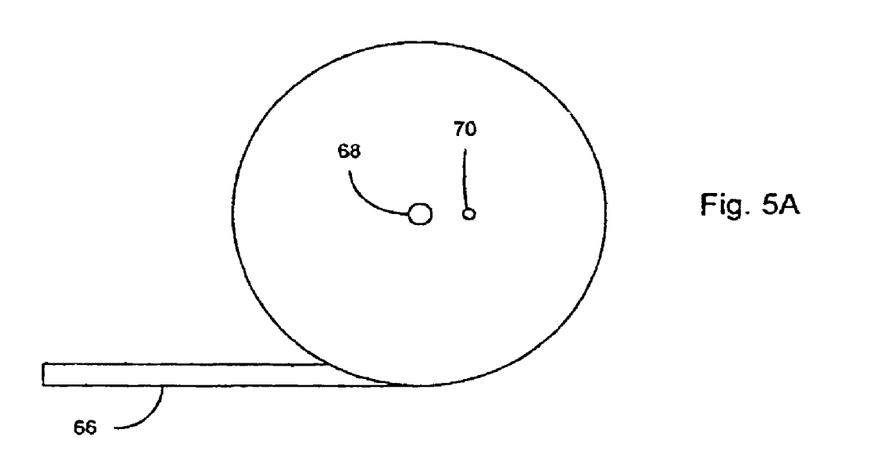
FIG. 5A is a top view of the pressure retention vessel of FIG. 5.

As shown in FIGS. 5 and 5A, the pressure retention vessel 36 includes an inlet 66 for receiving the intimately mixed/dissolved stream 34, and has two outlets 68, 70. The first outlet 68 is for the disinfected/treated intimately mixed/dissolved stream or treated stream 44 and the second outlet 70 provides a means for evacuating any residual gas that may have escaped from the liquid or accumulated in the pressure retention vessel 36. The gas is evacuated through the second outlet 70, and can then be recycled through a vapour-return line 42 to the inlet or suction side of the pump 14, so that no gas is wasted. As is shown more clearly in FIG. 5, the first outlet 68 extends into the pressure retention vessel 36 so that it is in contact with the liquid in the vessel. This ensures that only the liquid, treated stream 44 exits through the first outlet 68.

Once the disinfection/treatment period is complete, the treated stream 44 can be directed to a storage tank or can be put through additional processing steps. It is only once the disinfection/treatment period is complete that the pressure downstream of the pressure retention vessel is reduced, thereby allowing any remaining vapours to be released in micro-bubbles, which promotes additional contact between the liquid and the gas. If the treated stream 44 is going through additional processing steps, the micro-bubbles that are released as the pressure is reduced not only serve to promote further contact between the liquid and the gas, but also serve to facilitate additional processing steps. For instance, the treated stream 44 can be directed from the pressure retention vessel 36 and fed into a dissolved air flotation system 46 (shown in dotted lines in FIG. 1) for further treatment where the micro-bubbles act as a gas supply for the additional processing steps. The dissolved air flotation system 46 produces a purified stream 47. When the gas being used is ozone, the purified stream 47 from the dissolved air flotation system then passes through a degassing vessel 48. In the degassing vessel 48, any residual ozone gas is separated out of the stream 47 and is directed to an ozone destruct chamber 49 for a final treatment before being released from the ozone destruct chamber as air 50. The purified stream 47 exits the degassing vessel 48 as a disinfected, clean effluent stream 52, in accordance with practices known in the art. Alternatively, the treated stream 44 from the pressure retention vessel can pass directly to the degassing vessel 48 and ozone destruct chamber 49. As well, a portion of the disinfected/treated intimately mixed stream 44 can also be recycled back into the liquid feed line 12 via a liquid return line 54 as it exits pressure retention vessel 36.

While the present invention has been described with respect to certain preferred embodiments, it will be understood by persons skilled in the art that variations or modifications can be made without departing from the scope of the invention as described herein.

What is claimed is:

1. A mass transfer apparatus for dissolving a gas into a liquid stream, comprising:
   means for introducing a gas into a liquid stream to create a mixed stream;
   a pump having an inlet for receiving the mixed stream of liquid and gas, and an outlet; for discharging said mixed stream at an elevated pressure;
   at least one hydrocyclone connected downstream from said pump outlet; for shearing and more thoroughly mixing and dissolving said gas into said mixed/dissolved stream creating a more intimately mixed/dissolved stream, said at least one hydrocyclone having at least one inlet for receiving said pressurized mixed stream, and an outlet; for discharging said more intimately mixed/dissolved stream;
   a pressure retention vessel connected downstream from said hydrocyclone for holding said intimately mixed/dissolved stream at a predetermined pressure for a predetermined time period for effectively treating, disinfecting and/or clarifying said intimately mixed/dissolved stream, thereby creating a treated stream, said pressure retention vessel having an inlet for receiving said intimately mixed/dissolved stream from said hydrocyclone, a first outlet; for discharging said treated stream, and a second outlet; for discharging residual gas;

pressure control means in communication with said at least one hydrocyclone and said pressure retention vessel for adjusting the pressure of said mixed and intimately mixed/dissolved streams to ensure effective dissolution of said gas within said liquid stream; and means, in communication with said pressure retention vessel, for reducing the pressure downstream from said pressure retention vessel as said treated stream is released therefrom;

wherein said at least one hydrocyclone comprises:

a housing vessel equipped with said at least one hydrocyclone inlet and said hydrocyclone outlet;

a hydrocyclone liner contained in said housing vessel, said liner having an upper neck portion and a lower outlet portion, said lower outlet portion being in communication with said outlet of said housing vessel, and said liner having a internal diameter that reduces from said upper neck portion towards said lower outlet portion; and a spin inducer attached to the upper neck portion of said hydrocyclone liner and in communication with the at least one inlet of said hydrocyclone for inducing circular flow to the mixed stream as it enters said hydrocyclone.

2. A method for dissolving a gas into a liquid stream; comprising the steps of:

injecting a gas at atmospheric pressure via a gas feed line into a liquid stream to create a mixed stream;

pressurizing said mixed stream; to a predetermined level;

directing said mixed stream; into a hydrocyclone to create a more intimately mixed/dissolved stream;

directing said intimately mixed/dissolved stream; from the hydrocyclone to a pressure retention vessel, and holding said intimately mixed/dissolved stream;

in said pressure retention vessel at a predetermined pressure for a predetermined time period for effectively treating, disinfecting and/or clarifying said intimately mixed/dissolved stream thereby creating a treated stream;

wherein said hydrocyclone comprises:

a housing vessel equipped with at least one hydrocyclone inlet and outlet;

a hydrocyclone liner contained in said housing vessel, said liner having an upper neck portion and a lower outlet portion, said lower outlet portion being in communication with said outlet of said housing vessel, and said liner having a internal diameter that reduces from said upper neck portion towards said lower outlet portion; and a spin inducer attached to the upper neck portion of said hydrocyclone liner and in communication with the at least one inlet of said hydrocyclone for inducing circular flow to the mixed stream as it enters said hydrocyclone.

3. The method according to claim 2, wherein said mixed stream; is pressurized to between about 80-150 psig.

4. The method according to claim 2, wherein said gas is ozone, and said mixed stream; is pressurized to about 150 psig.

5. The method according to claim any one of claims 3, further comprising the steps of:

reducing the pressure downstream of the pressure retention vessel; and directing said treated stream; from said pressure retention vessel under reduced pressure downstream of the pressure retention vessel to a dissolved air flotation system for further treatment thereof.

6. The method according to claim 2, wherein said gas is ozone and said mixed/dissolved stream; is pressurized to about 150 psig, said method further comprising the steps of:

reducing the pressure downstream of the pressure retention vessel;

directing said treated stream; from the pressure retention vessel to a degassing vessel;

directing a first output stream; of residual ozone gas from said degassing vessel to an ozone destruct chamber; and retrieving a disinfected, clean effluent stream; of the remaining treated/disinfected liquid from said degassing vessel as a second output thereof.

7. The method according to claims 2, wherein said gas is ozone and said mixed/dissolved stream; Is pressurized to about 150 psig, said method further comprising the steps of:

reducing the pressure downstream of the pressure retention vessel;

directing said treated intimately mixed/dissolved stream; under reduced pressure from the pressure retention vessel to a dissolved air flotation system for further treatment thereof:

directing a purified stream; from said dissolved air flotation system to a degassing vessel;

directing a first output stream; of residual ozone gas from said degassing vessel to an ozone destruct chamber; and retrieving a disinfected, clean effluent stream; of the remaining treated/disinfected liquid from said degassing vessel as a second output thereof.

8. The method according to claim 2, further comprising the step of recycling any residual gas that collects in said pressure retention vessel through a vapour-return line to the gas feed line.

9. A method for dissolving a gas into a liquid stream; comprising the steps of:

injecting a gas at atmospheric pressure via a gas feed line into a liquid stream;

to create a mixed stream;

pressurizing said mixed stream; to about 80-150 psig;

directing said mixed stream; into a hydrocyclone to create a more intimately mixed/dissolved stream;

directing said intimately mixed/dissolved stream; from the hydrocyclone to a pressure retention vessel, and holding said intimately mixed/dissolved stream;

in said pressure retention vessel at a predetermined pressure for a predetermined time period for effectively treating, disinfecting and/or clarifying said intimately mixed/dissolved stream, thereby creating a treated stream;

reducing the pressure downstream of the pressure retention vessel; and directing said treated stream; from said pressure retention vessel under reduced pressure from the pressure retention vessel to a dissolved air flotation system for further treatment thereof; and recycling any residual gas that collects in said pressure retention vessel through a vapour-return line to the liquid feed line thereby creating a treated stream, wherein said hydrocyclone comprises:

a housing vessel equipped with said at least one hydrocyclone inlet and said hydrocyclone outlet;

a hydrocyclone liner contained in said housing vessel, said liner having an upper neck portion and a lower outlet portion, said lower outlet portion being in communication with said outlet of said housing vessel, and said liner having a internal diameter that reduces from said upper neck portion towards said lower outlet portion; and a spin inducer attached to the upper neck portion of said hydrocyclone liner and in communication with the at least one inlet of said hydrocyclone for inducing circular flow to the mixed stream as it enters said hydrocyclone.

* * * * *